UNITED STATES PATENT OFFICE.

HOWARD F. CHAPPELL, OF NEW YORK, N. Y., ASSIGNOR TO MINERAL PRODUCTS CORPORATION, OF NEW YORK, N. Y., A CORPORATION OF MAINE.

PROCESS OF PRODUCING AMMONIUM FLUORIDS.

1,235,552.　　Specification of Letters Patent.　　Patented Aug. 7, 1917.

No Drawing.　　Application filed July 17, 1913. Serial No. 779,506.

*To all whom it may concern:*

Be it known that I, HOWARD F. CHAPPELL, a citizen of the United States, residing in the borough of Manhattan, city, county, and State of New York, have invented certain new and useful Improvements in Processes of Producing Ammonium Fluorids; and I do hereby declare the following to be a full, clear, and exact description of the invention, such as will enable others skilled in the art to which it appertains to make and use the same.

The present invention relates to a cheap and efficient method of producing acid fluorid of ammonium (ammonium bi-fluorid) and fluorid of ammonium from the gases evolved when phosphate rock, apatite, bones or other phosphatic materials containing fluorin compounds are decomposed by sulfuric or other acids in the process of making phosphoric acid or superphosphates. This process is based upon the discovery that when these gases which contain hydrofluoric acid and silicon fluorid, are subjected to the action of ammonia, ammonium bi-fluorid and ammonium fluorid are produced, with the formation of silica or hydrate of silica which is precipitated. The gases generated in the mixing chamber by the action of acids on phosphates containing fluorids are drawn into towers of suitable construction down which a spray of aqueous ammonia is caused to fall. The liquid containing the precipitated silica is drawn off at the bottom of the tower, the silica removed therefrom by filtration or other suitable methods and the clarified solution which contains ammonium fluorid and ammonium bi-fluorid may be commercially utilized without further purification, or the fluorids may be recovered in a purified form from the liquid by distillation, or otherwise.

Water may be substituted in place of ammonia, for absorbing the gases generated when phosphatic materials containing fluorin compounds are subjected to the action of acids, thereby forming a solution containing hydrofluoric acid and hydrofluosilicic acid. By introducing ammonia into the water which has absorbed these gases, silica will be precipitated and fluorids of ammonium will be formed. The fluorids of ammonium will remain in solution and may be recovered in a purified form by distillation and crystallization or otherwise.

When recovering ammonium bi-fluorid and ammonium fluorid through the absorption of fumes from acid phosphate mixers by use of a series of two or more towers, by spraying each tower with the filtered liquor from the following tower in the series, it is possible to obtain a much more concentrated solution of ammonium bi-fluorid with a minimum loss of ammonia.

Having described my invention what I claim is:

1. The process of producing ammonium bi-fluorid and ammonium fluorid, which comprises absorbing in ammonia the fluorin present in the gases evolved in the production of phosphoric acid and phosphates from phosphatic material containing fluorin; substantially as described.

2. The process of producing ammonium bi-fluorid and ammonium fluorid, which comprises subjecting silicon fluorid to the action of ammonia in the presence of water, removing the resulting silica, and recovering the fluorids of ammonium; substantially as described.

3. The process of producing ammonium bi-fluorid and ammonium fluorid which comprises adding ammonia to an aqueous solution containing silicon fluorid, removing the separated silica and recovering the ammonium bi-fluorid and ammonium fluorid; substantially as described.

4. The process of producing ammonium bi-fluorid and ammonium fluorid, which comprises passing the gases and vapors containing silicon fluorid derived from the treatment of phosphatic material containing silicon and fluorin, into contact with an aqueous liquor containing ammonia, separating the liquid, after having been brought into contact one or more times with the said gases and vapors, from precipitated silicon compounds, and thereafter again bringing the so-treated liquid into contact with the gases and vapors, thereby obtaining a correspondingly concentrated solution with a minimum loss of ammonia; substantially as described.

In testimony whereof I affix my signature, in presence of two witnesses.

HOWARD F. CHAPPELL.

Witnesses:
M. A. BILL,
M. L. BOWEN.